July 16, 1946.

J. W. BAYLES 2,404,209

ELECTRIC GENERATOR

Filed Jan. 18, 1943

2 Sheets-Sheet 1

Inventor
John W. Bayles
By
Watson, Cole, Grindle & Watson
Attorney

July 16, 1946.  J. W. BAYLES  2,404,209
ELECTRIC GENERATOR
Filed Jan. 18, 1943  2 Sheets-Sheet 2

Inventor
John W. Bayles
By
Watson, Cole, Grindle & Watson
Attorney

Patented July 16, 1946

2,404,209

UNITED STATES PATENT OFFICE 2,404,209

ELECTRIC GENERATOR

John Wallis Bayles, Roker, Sunderland, England, assignor to A. Reyrolle & Company Limited, Hebburn-on-Tyne, England, a company of Great Britain Application January 18, 1943, Serial No. 472,757
In Great Britain March 13, 1942

4 Claims. (Cl. 171—223)

This invention relates to electric generators for purposes, such as welding, requiring a falling characteristic. For single-operator arc welding purposes, it is generally desirable that the voltage between the electrode and the work should fall from the striking value, which may be 50–70 volts, to zero on short circuit, and should rise to perhaps 20–40 volts when the arc is drawn, the exact values depending mainly on the type of electrode used. It is desirable that the fall of voltage with increase of current should be produced by the design of the generator rather than by the introduction of series resistance, in order to minimise power consumption.

Such a characteristic can be obtained with a generator of the type having pairs of adjacent poles of like polarity on open circuit, each pair comprising a main pole in which the flux tends to be increased by armature reaction but is restricted by saturation, and an auxiliary pole in which the flux tends to be reduced and reversed by armature reaction.

An object of the present invention is to provide a convenient form of generator having a comparatively low short circuit current rating and sensitive control so that a wide range of welding characteristics is produced simply and with relatively small range of open circuit voltage.

According to the present invention the windings include series windings on the auxiliary poles, shunt windings on the main poles and shunt windings on the auxiliary poles whereof a shunt winding on an auxiliary pole is so connected that its magneto-motive force opposes the flux established in the pole (by the other shunt windings) on open circuit. Preferably such reverse shunt winding is connected between brushes between which the voltage varies comparatively little.

Figure 1:
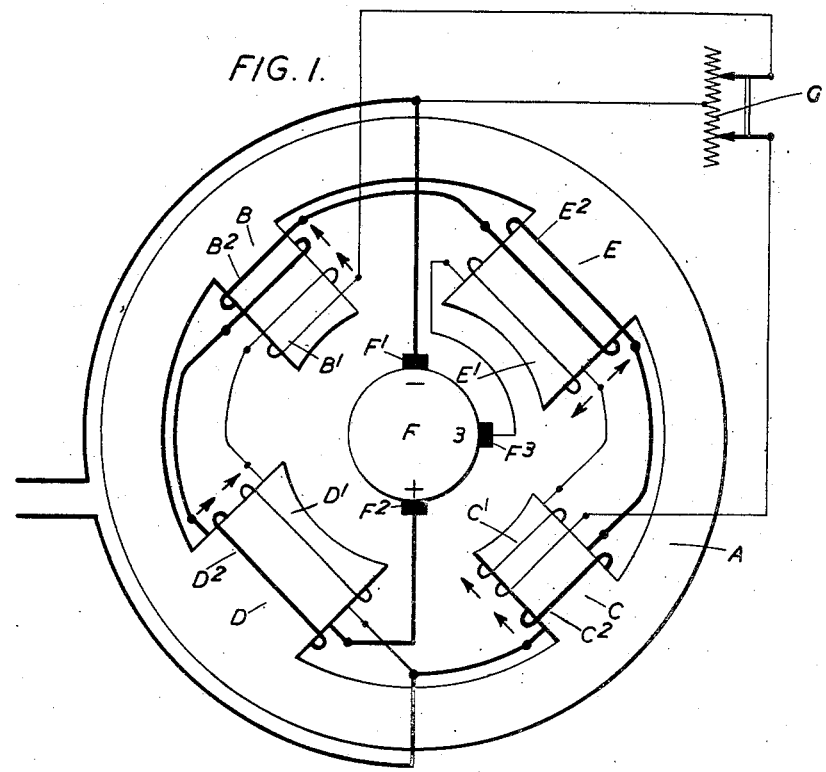
Figure 2:
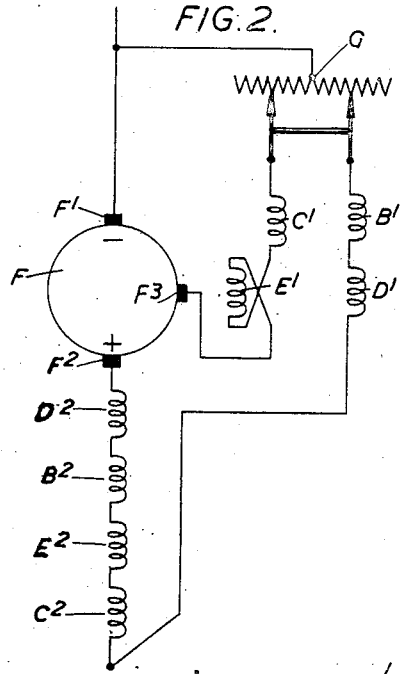
Figure 3:
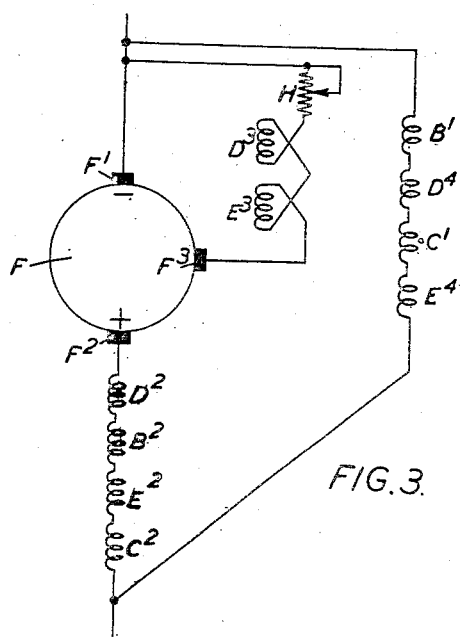
Figure 4:
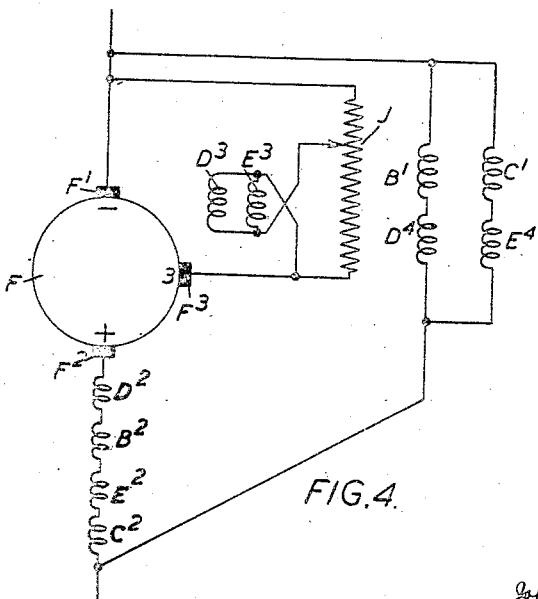

Various arrangements according to the invention will now be described by way of example with reference to the accompanying drawings, in which Figure 1 is a diagram of one form of welding generator, Figure 2 is a circuit diagram of the arrangement of Figure 1, and Figure 3 and Figure 4 are circuit diagrams of modified arrangements.

The invention is shown as applied to a welding generator A having two main poles B and C and two auxiliary poles D and E, and an armature F provided with a negative main brush $F^1$ and a positive main brush $F^2$ and a third brush $F^3$.

In the arrangement indicated in Figures 1 and 2 shunt windings $B^1$, $C^1$, $D^1$ and $E^1$ respectively and series windings $B^2$, $C^2$, $D^2$ and $E^2$ respectively are provided on the main and auxiliary poles. The series windings are connected in series between the positive brush $F^2$ and the positive terminal of the generator, the shunt windings $B^1$ and $D^1$ are connected in series with a portion of a regulating resistance G between the terminals of the generator, and the shunt windings $C^1$ and $E^1$ are connected in series with a further section of the regulating resistance G between the negative terminal and the third brush $F^3$ of the generator. The connections of the auxiliary pole shunt winding $E^1$ are such that on open circuit the magneto-motive force of $E^1$ opposes the flux of pole E, the direction of which is determined by the shunt coils on the other poles.

The effect is thus to reduce the short circuit current, since less armature reaction effect is required to give the necessary net excitation. The excitation direction of the several windings is indicated in Figure 1 by arrows.

Figures 3 and 4 indicate modified arrangements in which a reverse shunt winding is arranged on both auxiliary poles in addition to a forward shunt winding. This has the advantage of producing a more symmetrical design of generator, which simplifies manufacture.

Thus as shown in Figure 3 reverse shunt windings $D^3$ and $E^3$ provided on the auxiliary poles, are connected in series with a regulating resistance H, between the negative terminal of the generator and the third brush $F^3$. The main pole forward shunt windings $B^1$ and $C^1$ are connected in series with the auxiliary pole shunt windings $D^4$ and $E^4$ across the terminals of the generator.

Figure 4 shows an arrangement in which the reverse-shunt windings $D^3$ and $E^3$ are connected in parallel with each other, the two windings being connected across the negative terminal F, and the third brush $F^3$ through a potentiometer type regulating resistance J in such a way that the current flowing through the windings may be varied from maximum to zero as required to give various welding characteristics. The shunt windings $B^1$ and $D^4$ are connected in series across the terminals of the generator, and the shunt windings $C^1$ and $E^4$ are similarly connected.

Although the voltages induced in the armature by the main and auxiliary poles should be approximately balanced at short circuit, there is no reason why this should be so at open circuit. Therefore, for purposes of economy, the auxiliary poles are preferably arranged so that they also are saturated at open circuit even though they are of larger cross-section than the main poles.

The main poles have already been defined as those in which the flux tends to be increased by armature reaction, and the auxiliary poles as those in which the flux is decreased. Also, it will be understood that a reverse shunt coil, as the term is used in the present specification and claims, is one which, if disconnected, leaving all other coils and their currents unaltered, would cause the flux in the pole carrying the coil to tend to be increased, and in the original direction.

What I claim as my invention and desire to secure by Letters Patent is:

1. An electric generator for use in arc welding, developing a relatively high striking voltage, a minimum voltage on short circuit, and a voltage of intermediate value under the normal load imposed by a drawn arc, said generator having pairs of adjacent poles of like polarity on open circuit, each pair comprising a main pole in which the flux tends to be increased by armature reaction but is restricted by saturation, and an auxiliary pole in which the flux tends to be reduced and reversed by armature reaction, series windings on the auxiliary poles, shunt windings on the main poles, and shunt windings on the auxiliary poles including a reverse shunt winding so connected that its magnetomotive force opposes the flux established in the pole on open circuit.

2. An electric generator for use in arc welding, developing a relatively high striking voltage, a minimum voltage on short circuit, and a voltage of intermediate value under the normal load imposed by a drawn arc, said generator having pairs of adjacent poles of like polarity on open circuit, each pair comprising a main pole in which the flux tends to be increased by armature reaction but is restricted by saturation, and an auxiliary pole in which the flux tends to be reduced and reversed by armature reaction, series windings on the auxiliary poles, shunt windings on the main poles, and shunt windings on the auxiliary poles including a reverse shunt winding, said reverse shunt winding and a shunt winding on a main pole being connected in series between brushes across which there is little voltage variation, whereby the magnetomotive force of the reverse shunt winding on the auxiliary pole opposes the flux established in the pole on open circuit.

3. An electric generator for use in arc welding, developing a relatively high striking voltage, a minimum voltage on short circuit, and a voltage of intermediate value under the normal load imposed by a drawn arc, said generator having pairs of adjacent poles of like polarity on open circuit, each pair comprising a main pole in which the flux tends to be increased by armature reaction but is restricted by saturation, and an auxiliary pole in which the flux tends to be reduced and reversed by armature reaction, series windings on the auxiliary poles, shunt windings on the main poles, and shunt windings on the auxiliary poles including at least two reverse shunt windings so connected that their magnetomotive force opposes the flux established in the respective poles on open circuit.

4. An electric generator for use in arc welding, developing a relatively high striking voltage, a minimum voltage on short circuit, and a voltage of intermediate value under the normal load imposed by a drawn arc, said generator having pairs of adjacent poles of like polarity on open circuit, each pair comprising a main pole in which the flux tends to be increased by armature reaction but is restricted by saturation, and an auxiliary pole in which the flux tends to be reduced and reversed by armature reaction, series and shunt windings on the auxiliary poles, shunt windings on the main poles, and series windings on the main poles wound so as to reinforce the shunt windings thereon, the shunt windings on the auxiliary poles including a reverse shunt winding so connected that its magnetomotive force opposes the flux established in the pole on open circuit.

JOHN WALLIS BAYLES.